United States Patent
Sato

(10) Patent No.: US 7,372,783 B2
(45) Date of Patent: May 13, 2008

(54) OPTICAL INFORMATION STORAGE APPARATUS AND OPTICAL INFORMATION STORAGE SYSTEM

(75) Inventor: Tadashi Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 514 days.

(21) Appl. No.: 11/151,148

(22) Filed: Jun. 13, 2005

(65) Prior Publication Data

US 2006/0023584 A1     Feb. 2, 2006

Related U.S. Application Data

(63) Continuation of application No. PCT/JP03/07024, filed on Jun. 3, 2003.

(51) Int. Cl.
*G11B 17/22*     (2006.01)

(52) U.S. Cl. .............................. 369/30.32; 369/30.38; 711/114

(58) Field of Classification Search .. 369/275.1–275.5, 369/30.31, 30.32, 73.03, 189, 30.34, 47.1, 369/30.38, 30.42, 30.45; 711/112–115; 710/8.4; 709/218

See application file for complete search history.

(56) References Cited

U.S. PATENT DOCUMENTS

| | | | |
|---|---|---|---|
| 5,239,650 A | * | 8/1993 | Hartung et al. ................. 710/8 |
| 5,388,260 A | * | 2/1995 | Monahan et al. .............. 711/1 |
| 5,983,318 A | * | 11/1999 | Willson et al. .............. 711/113 |
| 6,006,308 A | | 12/1999 | Matsunami et al. |

FOREIGN PATENT DOCUMENTS

| | | |
|---|---|---|
| JP | 59-231757 | 12/1984 |
| JP | 63-025865 | 2/1988 |
| JP | 04-6854 | 1/1992 |
| JP | 8-045164 | 2/1996 |
| JP | 9-082010 | 3/1997 |
| JP | 9-282770 | 10/1997 |
| JP | 10-027408 | 1/1998 |
| JP | 10-254648 | 9/1998 |
| JP | 3055247 | 10/1998 |

* cited by examiner

*Primary Examiner*—Ali Neyzari
(74) *Attorney, Agent, or Firm*—Greer, Burns & Crain, Ltd.

(57) ABSTRACT

The present invention provides an optical information storage apparatus incorporates in a housing: a medium storing section in which optical storage media are stored; an information access section that makes an information access to the optical storage medium; and a medium moving section that moves the optical storage medium between the medium storing section and the information access section, to increase storage capacity and to reduce the size of the apparatus. The medium moving section executes a supply process of moving the optical storage medium along a supply path from the medium storing section to the information access section and a recovery process of moving the optical storage medium along a recovery path from the information access section to the medium storing section, the optical storage medium on the supply path and another optical storage medium being on the recovery path able to pass each other.

3 Claims, 10 Drawing Sheets

OPTICAL INFORMATION STORAGE APPARATUS AND OPTICAL INFORMATION STORAGE SYSTEM

This is a continuation of PCT International Application No. PCT/JP2003/007024, filed Jun. 3, 2003.

TECHNICAL FIELD

The present invention relates to an optical information storage apparatus that makes information accesses to an optical storage medium to which information accesses are optically made, and an optical information storage system having integrated optical information storage apparatuses.

BACKGROUND ART

In view of the rapid development of information communication industries, an explosive increase in the near future is expected in the amount of data such as transaction information and home page data which are transmitted on a communication network typified by the Internet or the like. Further, more and more virus problems and criminals are occurring on the communication network. Consequently, efforts have been made to make logging on the Internet or the like compulsory. On the basis of these present circumstances and expectations, there is a strong demand for an increase in the capacities of information storage apparatuses. However, a hard disk, a kind of mass information storage apparatus to and from which information can be written and read at high speed, requires high costs for extensions. Accordingly, at present, there is no other way but to dispose of information exceeding the capacity of the hard disk. A magnetic tape storage apparatus, a kind of mass information storage apparatus, enables the inexpensive realization of a large capacity exceeding that of hard disks. However, the magnetic tape is a sequential medium to and from which information is sequentially written or read, and thus offers insufficient information I/O speeds. Consequently, at present, the magnetic tape storage apparatus is used only for applications for the longtime storage of information.

The simple storage of a large amount of data is insufficient to deal with the explosive increase in the amount of data expected to occur in the near future. It is desirable in for example, the following fields to inexpensively enable both the storage of a betabyte-scale amount of information and high-speed accesses within several seconds (what is called near-line accesses) in order to secure advanced retrieval capabilities: the field of data mining in which a consumption trend or the like is found out from a large amount of information such as sale information, the field of experimental data analysis in atomic physics, the field of collation techniques using fingerprints or DNA information, the field of patent information retrieval, the field of banks and securities, the field of electronic clinical charts, and the field of IDC (Internet Data Center).

As a high-speed and mass next-generation storage apparatus, an optical information apparatus which stores information using an optical storage medium typified by MO or DVD is gathering much attention instead of the hard disk and magnetic tape, which have the above disadvantages. The optical information storage apparatus enables information to be read or written at high speed and is expected to offer a drastically increased capacity in the near future as a result of technical renovations such as development of blue laser diodes or surface recording systems. It is also expected to realize a storage capacity comparable to that of the magnetic tape storage apparatus.

A possible next-generation optical information storage apparatus has, for example, a magazine that stores optical storage media, a drive that writes or reads information to or from an optical storage medium, and a changer that moves the optical storage medium between the magazine and the drive, the three components being compactly housed in a housing. If such an optical information storage apparatus is realized, the capacity can be easily increased by increasing the number of optical storage media or arranging optical information storage apparatuses. Moreover, maintenance can be easily carried out by detaching or replacing the multiple magazines and optical storage media arranged in the housing.

For the above next-generation optical information storage apparatus, an optical storage medium on which a read or write operation has been completed needs to be reliably replaced, within a small area, with a new one stored in the magazine. This technique is described, for example, in Patent Documents 1 and 2 in conjunction with a disk auto changer that realizes the precise delivery of disks, in Patent Documents 3 and 4 in conjunction with a disk auto changer having a reduced apparatus size, and in Patent Document 5 in conjunction with a disk changer apparatus having a reduced apparatus size and which realizes the precise delivery of disks.

(Patent Document 1)
Japanese Patent Laid-Open No. 9-282770
(Patent Document 2)
Japanese Utility Model Laid-Open No. 3055247
(Patent Document 3)
Japanese Patent Laid-Open No. 9-82010
(Patent Document 4)
Japanese Patent Laid-Open No. 8-45164
(Patent Document 5)
Japanese Patent Laid-Open No. 10-27408

However, an object of such an optical information storage apparatus as described above is considered to access, at high speed, information dividedly stored in multiple optical storage media as if the information were recorded in a single storage medium. To achieve this object, it is necessary to quickly replace an optical storage medium on which a read or write operation has been completed with one on which the next write or read operation is to be performed. However a technique realizing such replacement is not yet known.

DISCLOSURE OF THE INVENTION

In these circumstances, it is an object of the present invention to provide an optical information storage apparatus that enables an optical storage medium on which an information access has been completed to be automatically quickly replaced with a new one to which the next information access is to be made, as well as optical information storage system having integrated optical information storage apparatuses.

An optical information storage apparatus according to the present invention which accomplishes this object includes:

a medium storing section in which optical storage media to which an information access is optically made are stored, an information access section in which the optical storage medium is loaded to make an information access to the optical storage medium, and a medium moving section that executes a supply process of moving the optical storage medium along a supply path from the medium storing section to the information access section and a recovery process of moving the optical storage medium along a recovery path from the information access section to the medium storing section, the optical storage medium on the supply path and another optical storage medium on the recovery path being able to pass each other.

According to the optical information storage apparatus of the present invention, the optical storage medium on which an information access has been completed is moved along the recovery path, while the new optical storage medium to which an information access is to be made is moved along the supply path. This enables the simultaneous execution of the supply and recovery processes for these optical storage media. Therefore, the optical storage media can be automatically replaced quickly with each other.

Further, according to the optical information storage apparatus, preferably, the medium moving section loads an optical storage medium in the information access section at the end of the supply process and releases the optical storage medium from the information access section at the beginning of the recovery process, and in the information access section, a position of the optical storage medium at which the medium moving section loads the optical storage medium differs from a position of the optical storage medium at which the medium moving section releases the optical storage medium.

The use of the preferred optical information storage apparatus enables the loading of a new optical storage medium in the information access section to be carried out simultaneously with the release of the optical storage medium on which an information access has been completed. This makes it possible to further reduce the time required to replace the optical storage medium.

Further, an optical information storage system according to the present invention includes:

multiple optical information storage apparatuses each having a medium storing section in which optical storage media to which an information access is optically made are stored, an information access section in which the optical storage medium is loaded to make an information access to the optical storage medium, and a medium moving section that executes a supply process of moving the optical storage medium along a supply path from the medium storing section to the information access section and a recovery process of moving the optical storage medium along a recovery path from the information access section to the medium storing section, the optical storage medium on the supply path and another optical storage medium on the recovery path being able to pass each other, a system housing in which the plurality of optical information storage apparatuses are detachably mounted, and a control section that controls information accesses to the multiple optical information storage apparatuses mounted in the system housing.

The optical information storage system of the present invention has the multiple optical information storage apparatuses in each of which the medium storing section, an information access section, and the medium moving section are stored in the blade housing. This makes it possible to construct a compact, mass storage system. Further, the capacity can be easily increased by increasing the number of optical storage media or optical information storage apparatuses. Maintenance can be easily carried out by detaching or replacing the medium storing sections or optical information storage apparatuses.

BEST MODE FOR CARRYING OUT THE INVENTION

Embodiments of the present invention will be described below.

Figure 1:
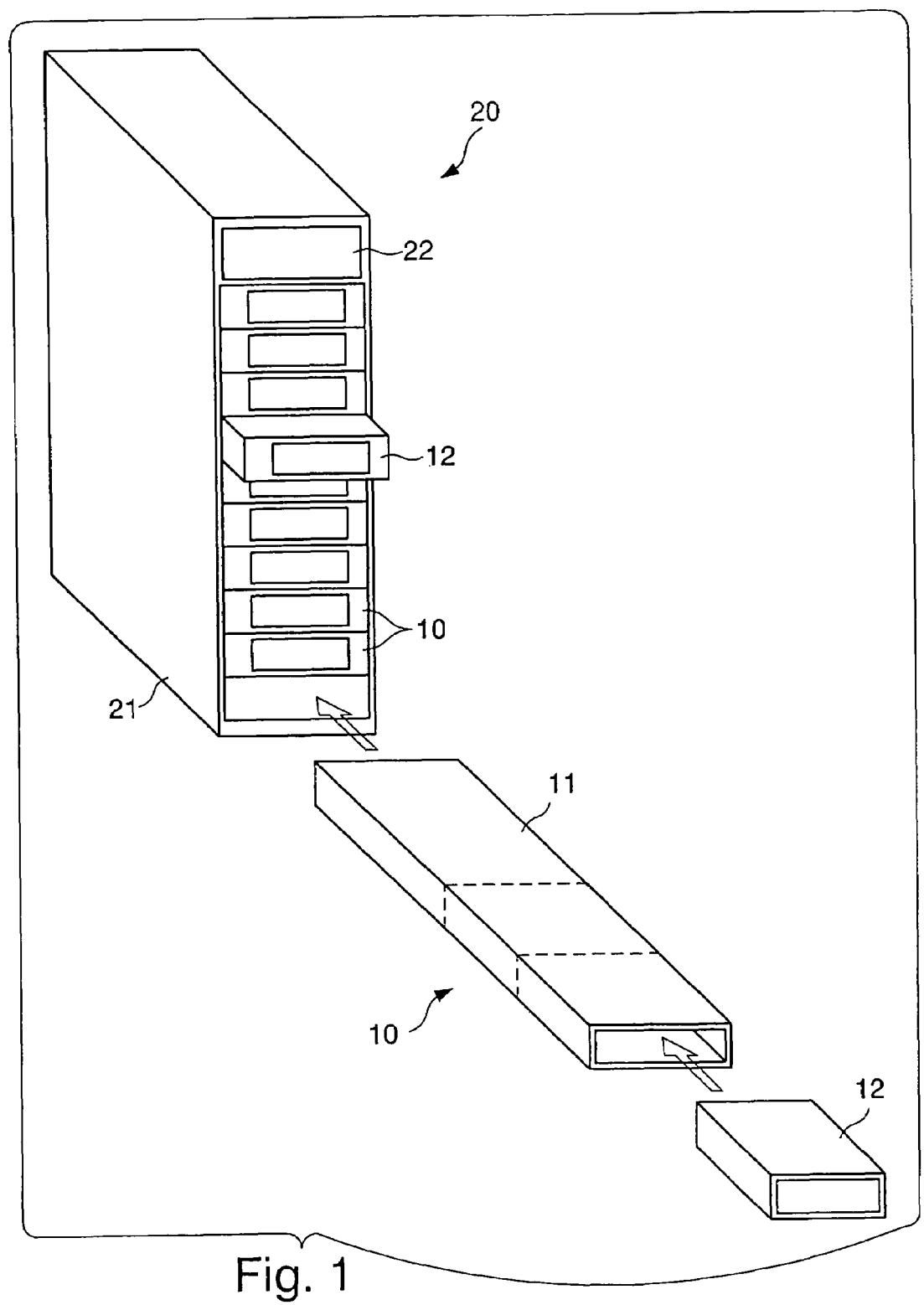
FIG. 1 is a diagram showing the appearance of an embodiment of an optical information storage system and of an embodiment of an optical information storage apparatus.

FIG. 1 is a diagram showing the appearance of an embodiment of an optical information storage system and of an embodiment of an optical information storage apparatus according to the present invention.

FIG. 1 shows a blade apparatus 10 corresponding to an embodiment of the optical information storage apparatus according to the present invention which uses magneto-optic (MO) disks as examples of optical storage media according to the present invention. FIG. 1 also shows an aggregate system 20 corresponding to an embodiment of the optical information storage system according to the present invention into which a multiplicity of (in this drawing, 10) the blade apparatuses 10 are incorporated.

A multiplicity of the blade apparatuses 10 are releasably mounted in a housing 21 of the aggregate system 20. The housing 21 corresponds to an example of a system housing according to the present invention.

A magazine 12 in which multiple MO disks are stored is detachably placed at one end of the housing 11 of each blade apparatus 10. The magazine 12 is detachable even when the blade apparatus 10 has been inserted into the housing 21 of the aggregate system 20. The magazine 12 corresponds to an example of a medium storing section according to the present invention.

Further, the aggregate system 20 has a control device 22 that controls recording and reproduction of information in each of the multiple blade apparatuses 10. The control device 22 corresponds to an example of a control section according to the present invention.

In the aggregate system 20, the multiple blade apparatuses 10 are compactly housed in the housing 21 to constitute a compact, mass storage system. The capacity can be easily increased by increasing the number of MO disks or blade apparatuses 10. Maintenance can be easily carried out by detaching or replacing the magazines 12 or blade apparatuses 10.

Figure 2:
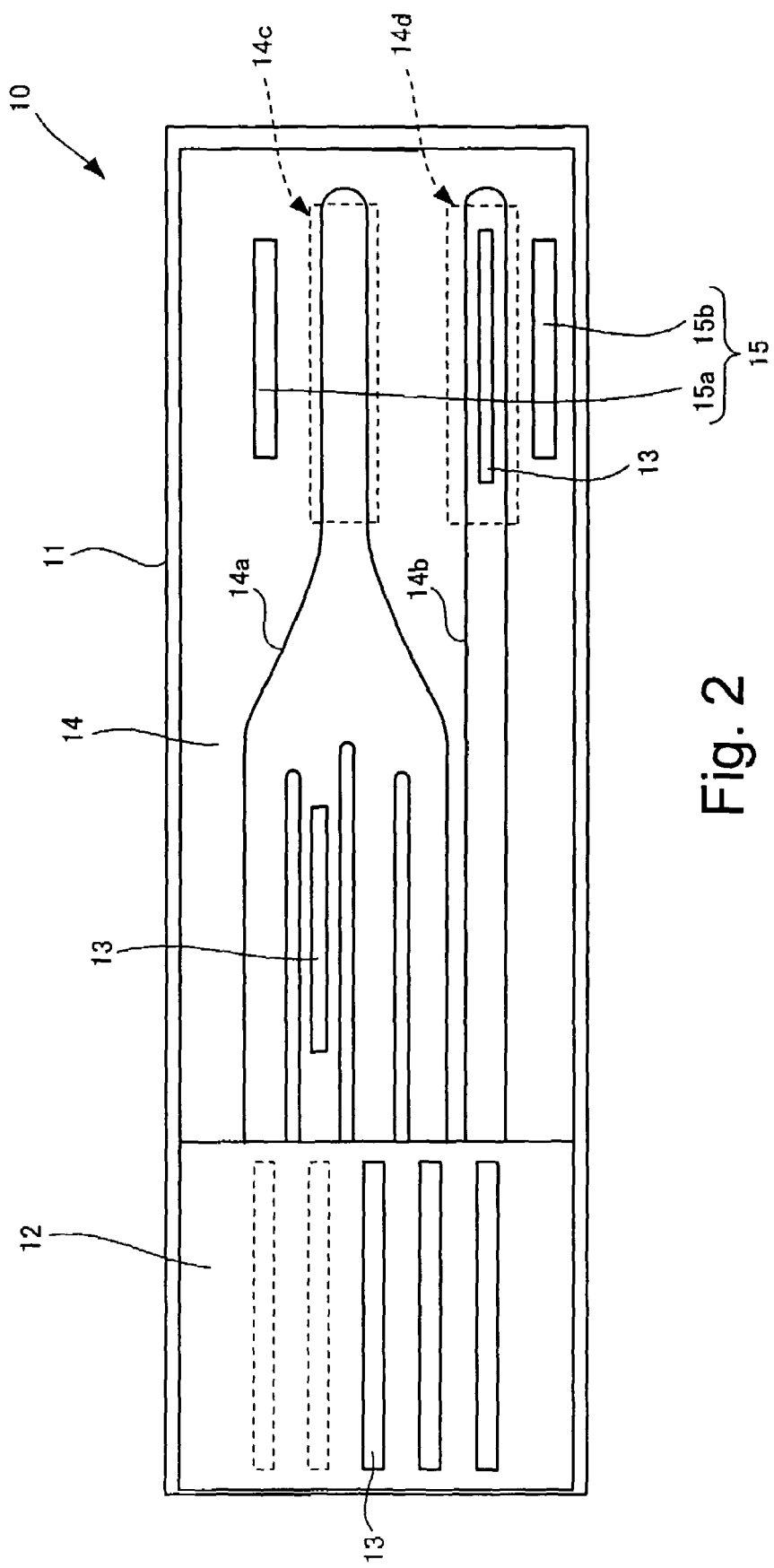
FIG. 2 is a simplified diagram showing the configuration of a blade apparatus.

FIG. 2 is a simplified diagram showing the configuration of the blade apparatus.

The blade apparatus 10, also shown in FIG. 1, has the above magazine 12, an information access section 15 that records and reproduces information on and from an MO disk 13, and a moving section 14 that moves the MO disk 13 between the magazine 12 and the information access section 15, all these components being provided in the housing 11.

A multiplicity of the MO disks 13 are aligned and stored in the magazine 12. The magazine 12 has a push-out mechanism (not shown) that pushes out the MO disk 13. The push-out mechanism receives information from a controller (described later) specifying an MO disk 13 and pushes out the MO disk 13 in accordance with the information to the moving section 14.

The moving section 14 has two separate channels, that is, a supply channel 14a through which the MO disk 13 is guided during a supply process in which the MO disk 13 is moved from the magazine 12 to the information access section 15 and a recovery channel 14b through which the MO disk 13 is guide during a recovery process in which the MO disk is returned from the information access section 15 to the magazine 12. The push-out mechanism of the magazine 12 pushes out the MO disk 13 to the supply channel 14a in the moving section 14. The moving section 14 then moves the MO disk 13 to the information access section 15 along the supply channel 14a to load it in the information access section 15. Further, the information access section 15 places the MO disk 13 on which an information access has been completed, in the recovery channel 14b. The moving section 14 then releases the MO disk 13 from the information access section 15. The released MO disk 13 is moved along the recovery groove 14b and back to the magazine 12. The supply channel 14a corresponds to an example of a supply path according to the present invention. The recovery path 14b corresponds to an example of a recovery path according to the present invention. The moving section 14 corresponds to an example of a medium moving section according to the present invention. A detailed description will be given later of a method of moving the MO disk 13.

The information access section 15 is composed of drives 15a and 15b and corresponds to an example of an information access section according to the present invention. When the moving section 14 moves the MO disk 13 to a loading section 14c on the supply channel 14, both drives 15a and 15b moves to the MO disk 13. Then, the drives 15a and 15b writes or reads information to or from the MO disk 13 while sandwiching it between the drives 15a and 15b. Once the information has been completely read or written, the drives 15a and 15b move to a release position 14d on the recovery channel 14b while gripping the MO disk 13. The drives 15a and 15b releases the MO disk 13 at the release position 13. The loading position 14c corresponds to an example of the "position of the optical storage medium at which the medium moving section loads the optical storage medium" according to the present invention. The release position 14d corresponds to an example of the "position of the optical storage medium at which the medium moving section releases the optical storage medium" according to the present invention. Description will be given later of a method of loading and releasing the MO disk 13.

A connector is provided at an end of the blade apparatus 10 which is opposite the magazine 12; the connector 16a is an interface that transfers data between the blade apparatus 10 and external equipment. When the blade apparatus 10 is installed into the housing 21 of the aggregate system 20, shown in FIG. 1, the connector is joined to a connector of the aggregate system 20.

Figure 3:
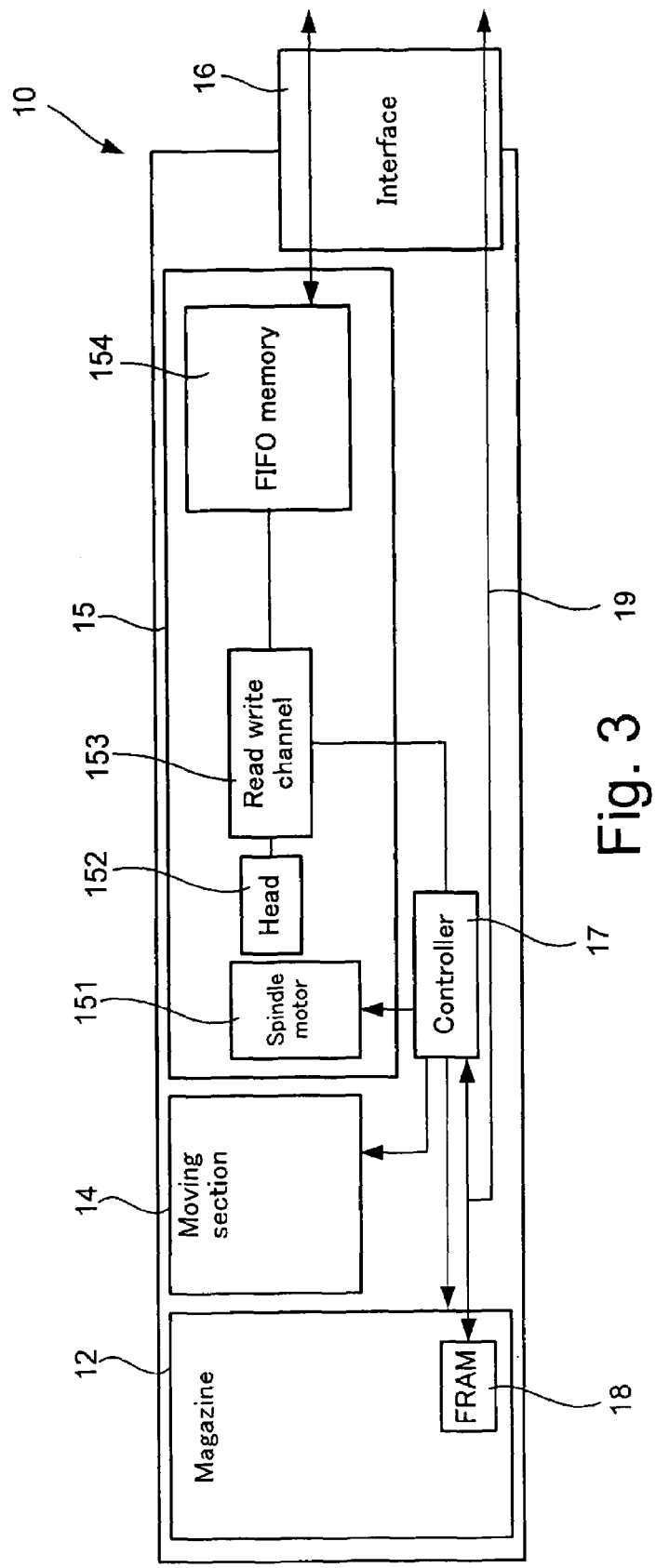
FIG. 3 is a functional block diagram showing the functional structure of the blade apparatus.

FIG. 3 is a functional block diagram showing the functional structure of the blade apparatus.

As described above, the blade apparatus 10 has the magazine 12, the moving section 14, and the information access section 15. The blade apparatus 10 further has a controller 17 that controls the moving section 14 and the access section 15 and an interface 16 corresponding to the connector 16a, shown in FIG. 2, and transfers data between the blade apparatus 10 and external equipment. The interface 16 is selected from among well-known high-speed serial interfaces such as IEEE1394, USB, and serial ATAPI. A detailed description of the interface 16 is omitted.

The information access section 15 has a spindle motor 151 that holds and rotates an MO disk and a head 152 that irradiates the MO disk with laser light to record or reproduce information. The spindle motor 151 and the head 152 are provided in the drives 15a and 15b shown in FIG. 2, respectively. The information access section 15 also has a read write channel 153 and a first-in first-out (FIFO) memory 154 functioning as a buffer.

Further, the magazine 12 has an FRAM 18 that stores, for example, the disk numbers of the stored MO disks and information on the addresses at which the MO disks are stored.

When external equipment specifies unique information indicating an MO disk through a path (not shown) via the interface 16, the controller 17 finds the MO disk indicated by the unique information on the basis of the information stored in the FRAM 18. The controller 17 instructs the magazine 12 and moving section 14 on the MO disk found. If a new MO disk is stored in the magazine 12 or the storage area of any MO disk is changed, the disk number of and address information on the MO disk stored in the FRMA 18 are updated.

The blade apparatus 10 also has an access path 19 through which external equipment directly accesses the FRAM 18 while bypassing the controller 17. Even if the power supply to the blade apparatus 10 is off, external equipment can check the information in the FRAM 18 via the access path 19.

The blade apparatus 10 is basically configured as described below.

The embodiment of the present invention for the blade apparatus 10 is mainly characterized by the motion of the moving section 14 and information access section 15. The following description will focus on these characteristics.

First, a detailed description will be given of the components constituting the blade apparatus 10.

Figure 4:
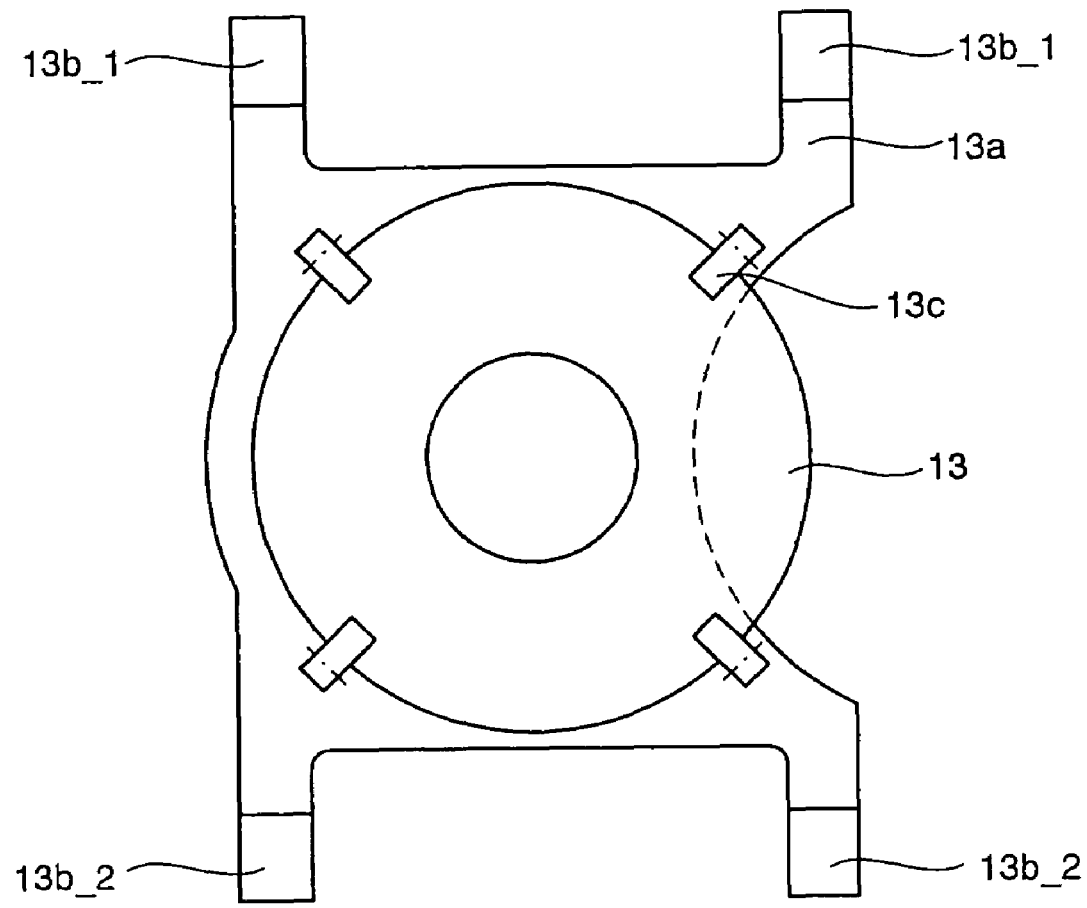
FIG. 4 is a diagram showing an MO disk stored in a magazine.

FIG. 4 is a diagram showing an MO disk stored in the magazine.

The MO disk 13 is stored in the magazine 12, shown in FIGS. 1 to 3, so as to sit on the tray 13a. The tray 13a has guide pins 13b_1 and 13b_2 fitted into the supply channel 14a and recovery channel 14b, shown in FIG. 2 and presser pawls 13c that fixes the MO disk 13 to the tray 13a. The MO disk 13 is fixed to the tray 13a using the presser pawls 13c.

Figure 5:
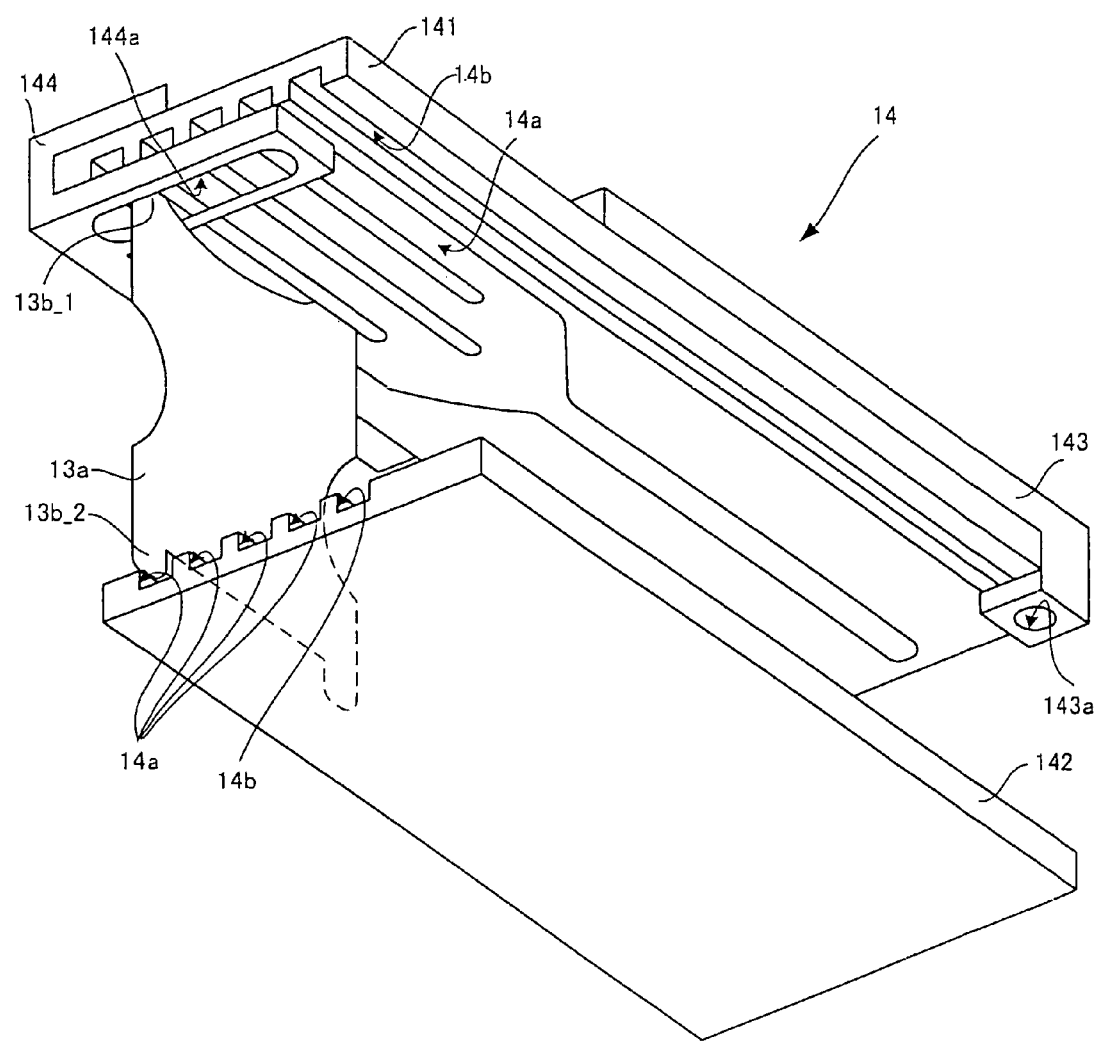
FIG. 5 is a diagram showing the configuration of a moving section.

FIG. 5 is a diagram showing the configuration of the moving section.

The moving section 14 has an upper guide rail 141 and a lower guide rail 142. The supply channel 14a and recovery channel 14b, also shown in FIG. 2, are formed in the upper guide rail 141 and the lower guide rail 142. When for example, the information access section 15 makes an information access or the MO disk 13 is placed in the moving section 14, the upper guide rail 141 and the lower guide rail 142 receive an instruction from the controller 17 to move in an opening or closing direction (vertical direction). Further, a supply driving arm 144 is fitted on the supply channel 14*a* in the upper guide rail 141; a pawl hole 144*a* is formed in the supply driving arm 144. A recovery driving arm 143 is fitted on the recovery channel 14*b* in the upper guide rail 141; a pawl hole 143*a* is formed in the recovery driving arm 143. The guide pins 13*b*_2 of the tray 13*a* are fitted into the supply groove 14*a* or recovery groove 14*b* in the lower guide rail 142. The guide pins 13*b*_1 of the tray 13*a* are fitted into the supply groove 14*a* or recovery groove 14*b* in the upper guide rail 141 through the pawl hole 144*a* in the supply driving arm 144 or the pawl hole 143*a* in the recovery driving arm 143. The MO disk is thus placed on the grooves.

Description has been given with reference to FIG. 5 and will now be given with reference to FIG. 6.

Figure 6:
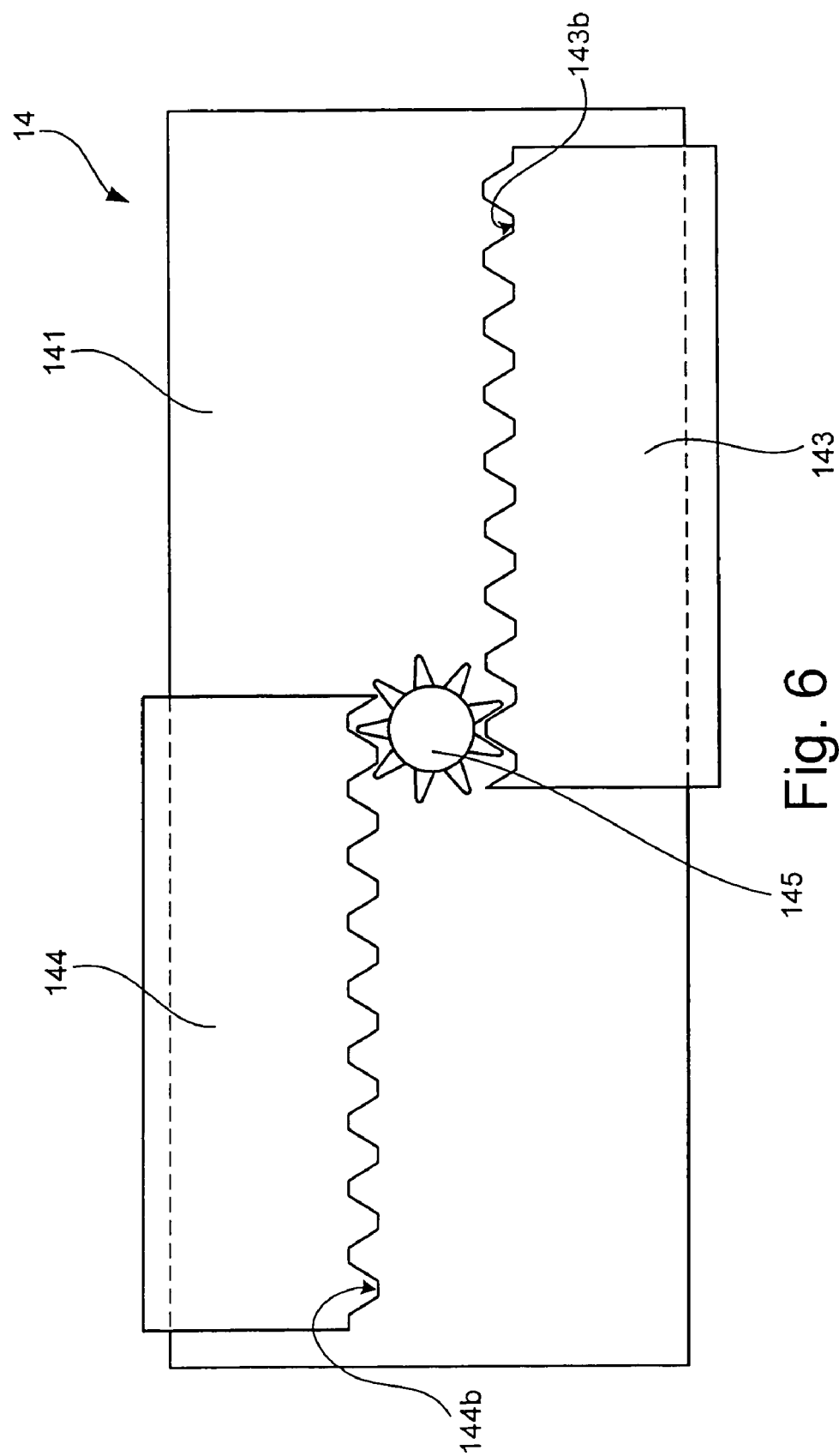
FIG. 6 is a diagram showing the top surface of an upper guide rail with respect to a bottom surface in which channels are formed.

FIG. 6 is a diagram showing the top surface of the upper guide rail with respect to the bottom surface in which the channels are formed.

A pinion gear 145 is provided on the top surface of the upper guide rail 141. The supply driving arm 144 and recovery driving arm 143, fitted around the upper guide rail 141, have gears 144*b* and 143*b*, respectively, that interlock with the pinion gear 145. Rotation of the pinion gear 145 interlocks the pinion gear 145 with the gears 143*b* and 144*b* to move the supply driving arm 144 and recovery driving arm 143 in the opposite directions.

Now description will be given with reference to FIG. 5.

The supply driving arm 144 and recovery driving arm 143 are moved on the upper guide rail 141 in the opposite directions as described above. The MO disk 13 is moved along the supply channel 14*a* and recovery groove 14*b* together with the tray 13*a* as the supply driving arm 144 and the recovery driving arm 143 move with the guide pins 13*b*_1 of the tray 13*a* caught in the pawl holes 143*a* and 144*a*.

Figure 7:
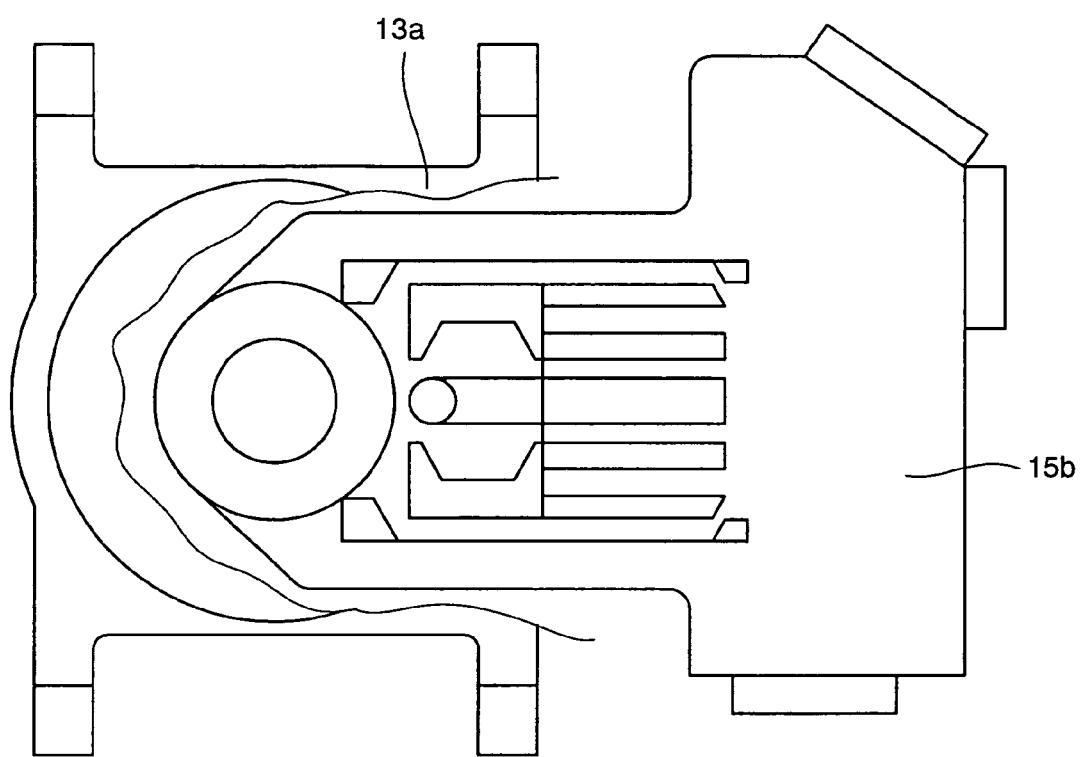
FIG. 7 is a diagram showing an MO disk loaded in a drive.

FIG. 7 is a diagram showing the MO disk loaded in the drive.

While remaining fixed to the tray 13*a*, the MO disk 13 is moved by the moving section 14 to the information access section 15. The drives 15*a* and 15*b* grips the MO disk 13 by sandwiching it between the drives 15*a* and 15*b*.

The components of the blade apparatus 10 are configured as described below.

Figure 8:
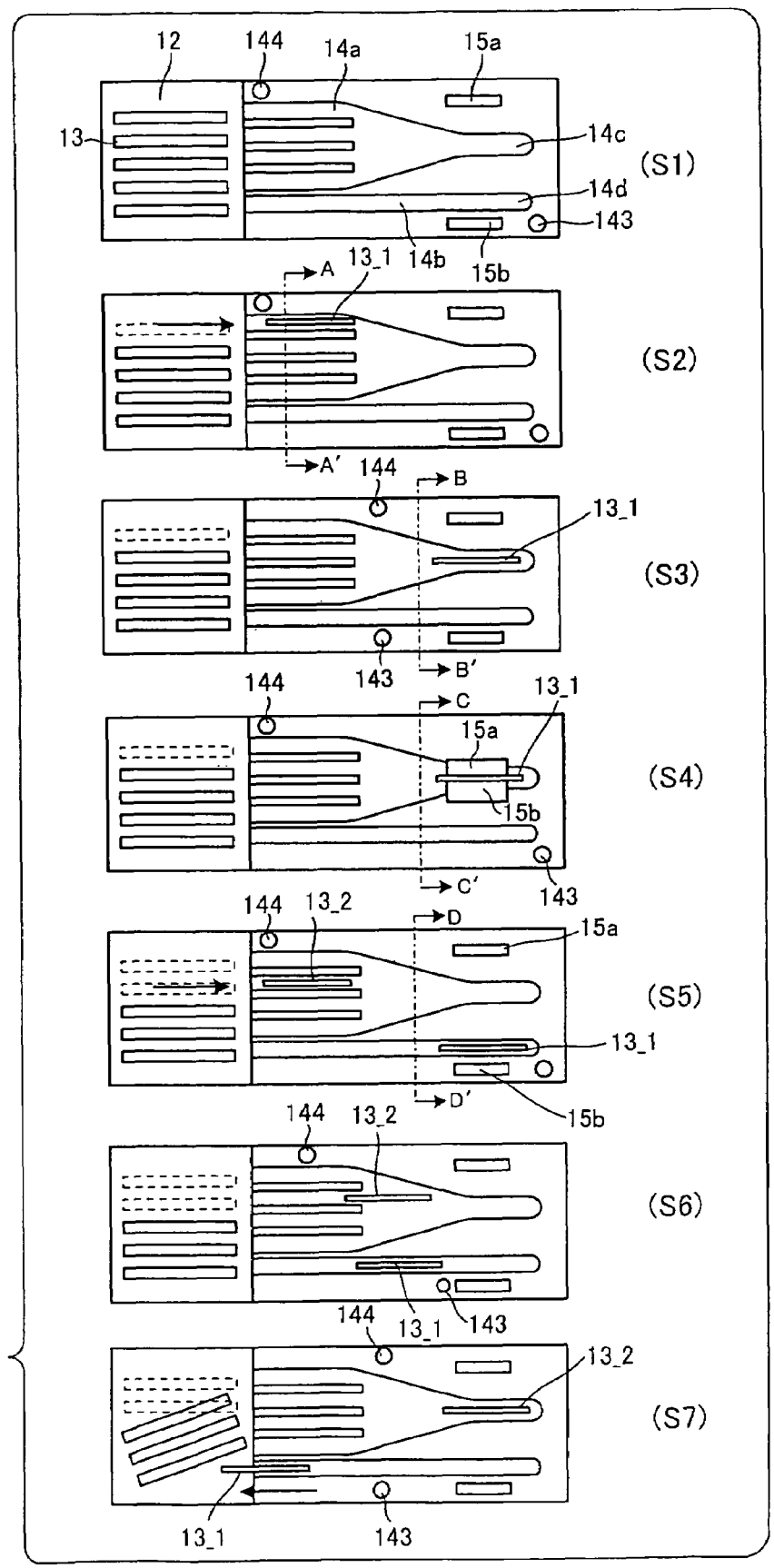
FIG. 8 is a simplified diagram showing motion of the moving section and MO disk.
Figure 9:
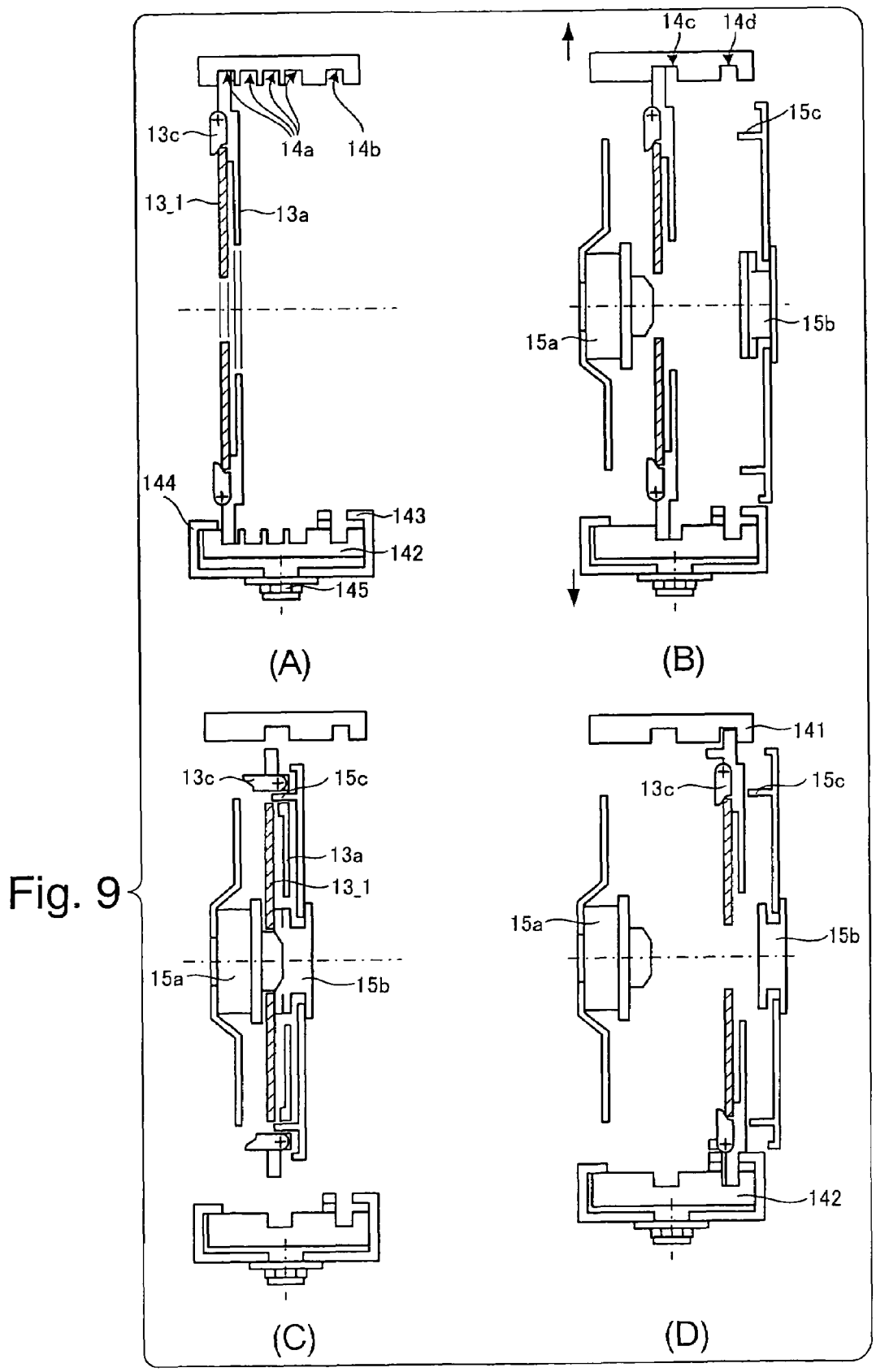
FIG. 9 is a diagram showing motion of the drive.

FIG. 8 is a simplified diagram showing motion made by the moving section and MO disk when a series of operations are performed for loading the MO disk stored in the magazine into the drive for an information access and then returning the MO disk to the magazine. FIG. 9 is a diagram showing motion made by the drive when the series of operations are performed.

With reference to FIGS. 8 and 9, description will be given of the series of operations of making an information access to the MO disk and then returning the MO disk to the magazine.

Here, in FIG. 8, for simplification, the positions of the recovery driving arm 143 and supply driving arm 144 are representatively shown at the ends of the moving section 14 where the pawl holes 143*a* and 144*a* are provided.

First, in an initial state shown in step S1 in FIG. 8, the supply driving arm 144 is placed closer to the drive 12, while the recovery driving arm 143 is placed closer to the information access section 15.

Upon receiving information specifying an MO disk 13_1 from the controller 17, shown in FIG. 3, the magazine 12 pushes out the MO disk 13_1, indicated by the information, to the moving section 14. The guide pins 13*b*_2 of the tray 13*a*, fixed to the MO disk 13_1 and shown in FIG. 5, are fitted into the supply channel 14*a* in the lower guide rail 142. Then, the upper guide rail 141 is moved downward to fit the guide pins 13*b*_1 into the supply channel 14*a* in the upper guide rail 141 through the pawl hole 144*a* in the supply driving arm 144 (step S2 in FIG. 8).

Part (A) of FIG. 9 is a sectional view of the information access section 15 taken along arrow AA' in step S2 in FIG. 8, as viewed from the magazine 12.

The MO disk 13_1 is fixed by the presser pawls 13*c* to the tray 13*a* and placed on the supply channel 14*a*.

The MO disk 13_1, to which an information access is to be made, is placed in the supply channel 14*a*. Then, as shown in step S3 in FIG. 8, the supply driving arm 144 is moved to the information access section 15 to shift the MO disk 13_1 to the loading position 14*c* (loading of the MO disk) At this time, as the supply driving arm 144 moves, the recovery driving arm 143 moves toward the magazine 12 and opposite the direction in which the supply driving arm 144 moves.

Part (B) of FIG. 9 is a sectional view of the information access section 15 taken along BB' in step S3 in FIG. 8, as viewed from the magazine 12.

The MO disk 13_1 is placed at the loading position 14*c* between the drives 15*a* and 15*b*. That drive 15*b* has pins 15*c* that push the presser pawls 13*c*.

When the MO disk 13_1 is placed at the loading position 14*c*, the drives 15*a* and 15*b* are moved to the MO disk 13_1 as shown in step S4 in FIG. 8. When the drives 15*a* and 15*b* grip the MO disk 13_1, the upper guide rail 141 is moved upward, while the lower guide rail 142 is moved downward. The guide rails are separated from each other in the vertical direction to take the MO disk 13_1 off the guide rails. Subsequently, the information access section 15 starts making an information access to the MO disk 13_1. Further, when the information access to the MO disk 13_1 is started, the supply driving arm 144 is moved closer to the magazine 12 as in the case of step S1. In association with this movement, the recovery driving arm 143 is moved closer to the information access section 15.

Part (C) of FIG. 9 is a sectional view of the information access section 15 taken along CC' in step S4 in FIG. 8, as viewed from the magazine 12.

When the drives 15*a* and 15*b* grip the MO disk 13_1, the pins 15*c* of the driven 15*b* push the presser pawls 13*c* to take the MO disk 13_1 off the tray 13*a*.

Description has been given with reference to FIGS. 8 and 9 and will now be given of the configuration of the presser pawls 13*c* and pins 15*c*.

Figure 10:
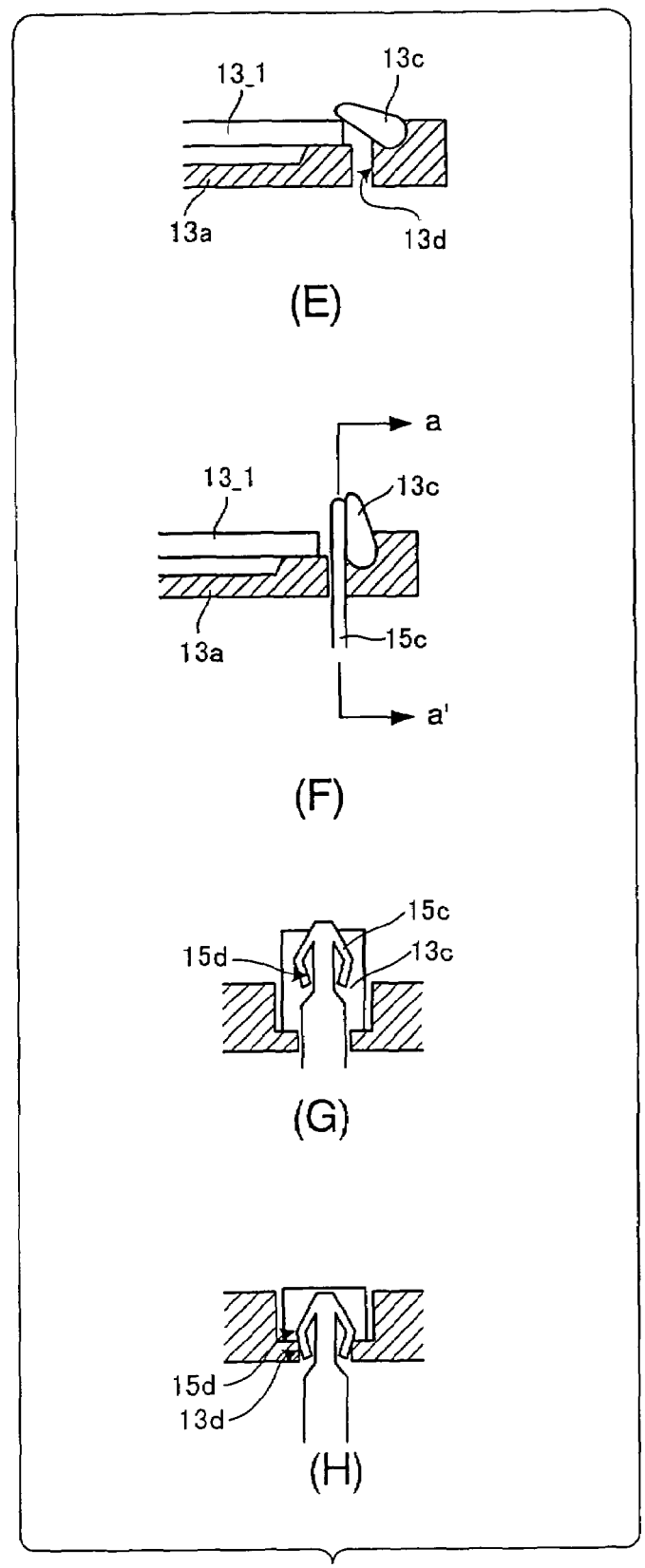
FIG. 10 is a diagram showing the configuration of presser pawls that fix the MO disk to a tray and of pins that push the presser pawls.

FIG. 10 is a diagram showing the configuration of presser pawls that fix the MO disk to a tray and of pins that push the presser pawls.

As shown in part (E) of FIG. 10, the MO disk 13_1 is fixed to the tray 13*a* by the presser pawls 13*c*, provided on the tray 13*a*.

When the MO disk 13_1 is removed from the tray 13, the pins 15*c* of the drive 15*b*, also shown in FIG. 9, are fitted into holes 13*d* formed in the tray 13*a*. At this time, pins 15*c* push up the presser pawls 13*c* to take the MO disk 13_1 off the tray 13*a* (part (F) of FIG. 10).

Part (G) of FIG. 10 is a sectional view taken along arrow aa' in part (F) of FIG. 10.

Each of the pins 15*c* is what is called a latched pin having a closable latch 15*d*. When the pin 15*c* is pulled by a predetermined or larger force, the latch 15*d* is closed to cause the pin 15*c* to slip out of the hole 13*d*. However, if the pin 15*c* is pulled by a smaller force, the latch 15*d* remains open to some degree. Thus, the latch 15*d* is caught in the hole 13*d* and fixed to the tray 13*a* as shown in part (H) of FIG. 10. Further, on this occasion, the pin 15*c* cannot sufficiently push up the presser pawl 13*c*. Consequently, the MO disk 13_1 remains fixed to the tray 13*a*. This state is applied to the movement of the MO disk 13_1 from the loading position 14*c* to the release position 14*d*, described later.

Description will be given with reference to FIG. 8 again.

Once the information access to the MO disk 13_1 is completed, the drives 15*a* and 15*b* move from the loading position 14*c* to the release position 14*d* on the recovery groove 14*b* while gripping the MO disk 13_1. The drives 15*a* and 15*b* then take off the MO disk 13_1 at the release position 14*d* (step S5 in FIG. 8).

Part (D) of FIG. 9 is a sectional view of the information access section 15 taken along DD' in step S5 in FIG. 8, as viewed from the magazine 12.

Once the information access to the MO disk 13_1 is completed, the drives 15*a* and 15*b* move to the respective original positions. During this process, as described above with reference to FIG. part (H) of FIG. 10, the latch 15*d* of the pin 15*c* is caught in the hole 13*d* in the tray 13*a*. The tray 13*a* and the MO disk 13_1 are moved to the release position 14*d* together with the drive 15*b*. When the MO disk 13_1 is moved to the release position 14*d*, first, only the lower guide rail 142 is moved to its original position. In this state, the drive 15*b* further moves to cause the pins 15*c* to slip out of the tray 13*a*. The MO disk 13_1 is then removed from the information access section 15.

In step S5 in FIG. 8, when the MO disk 13_1 is removed from the information access section 15, the drives 15*a* and 15*b* move to their original positions. At this time, the upper guide rail 141 is moved upward, while the lower guide rail 142 is moved to its original position. Moreover, through an operation similar to that in step S2, an MO disk 13_2 stored in the magazine 12 is pushed out into the supply channel 14*a* in the lower guide rail 142; the next information access is to be made to the MO disk 13_2. Subsequently, the upper guide rail 141 is returned to its original position. The MO disk 13_1 is placed in the recovery channel 14*b*, whereas the MO disk 13_2 is placed in the supply channel 14*a*.

When the MO disk 13_1 and the MO disk 13_2 are arranged in the respective channels, the recovery driving arm 143 is moved to the magazine 12. In association with this movement, the recovery driving arm is moved to the information access section 15 (step S6 in FIG. 8). At this time, the MO disk 13_1 and the new MO disk 13_2 pass each other; the MO disk 13_1 is moved along the recovery groove 14*b*, the information access has been completed on the MO disk 13_1, and the MO disk 13_2 is moved along the supply groove 14*a*. Moreover, as the movement proceeds, the new MO disk 13_2 is placed at the loading position 14*c* (loading of the MO disk). The MO disk 13_1 is moved from the release position 14*d* to immediately before the magazine 12 (release of the MO disk). Moreover, when the moving section 14 moves the upper guide rail 141, shown in FIG. 5, upward, the MO disk 13-1 is returned to the magazine 12 (step S7 in FIG. 8).

The above series of operations replace the MO disk 13-1, on which an information access has been completed, with the MO disk 13-2, to which an information access is to be made.

As described above, the moving section according to the present embodiment recovers the MO disk through the process different from the supply path, through which the MO disk is moved when supplied to the drive. Consequently, the movement for the supply process and the movement for the recovery process can be simultaneously carried out. This reduces the time required to replace the MO disk. Further, the loading position and the release position are separately designed; the MO disk is loaded at the loading position, and the MO disk is released at the release position. Accordingly, the loading of a new NO disk can be carried out simultaneously with the release of the MO disk on which an information access has been completed. Moreover, the MO disk can be replaced quickly.

The embodiment of the present invention has been described.

In the above description, the MO disk is shown as an example of the optical storage medium according to the present invention. However, the optical storage medium according to the present invention may be a DVD etc.

In the example described above, the information access section according to the present invention is the information access section that records and reproduces information on and from the MO disk. The information access section according to the present invention may either record or reproduce information on or from the optical storage medium.

In the example described above, the medium moving section according to the present invention is the moving section that moves the MO disk together with the tray for the MO disk by fitting the tray into the guide rail and using the pinion gear to move the guide rail. However, the medium moving section according to the present invention may move the MO disk by, for example, rolling it.

Further, in the example described above, a single new MO disk is caused to stand by in the moving section. However, the optical information storage apparatus according to the present invention may cause multiple new disks to stand by in the medium moving section so that MO disks on which information accesses have been completed are sequentially replaced with the new MO disks.

The invention claimed is:

1. An optical information storage apparatus comprising:
   a medium storing section in which a plurality of optical storage media to which an information access is optically made are stored;
   an information access section in which the optical storage medium is loaded to make an information access to the optical storage medium; and
   a medium moving section that executes a supply process of moving the optical storage medium along a supply path from the medium storing section to the information access section and a recovery process of moving the optical storage medium along a recovery path from the information access section to the medium storing section, the optical storage medium on the supply path and another optical storage medium on the recovery path being able to pass each other.

2. The optical information storage apparatus according to claim 1, wherein the medium moving section loads an optical storage medium in the information access section at the end of the supply process and releases the optical storage medium from the information access section at the beginning of the recovery process, and
   in the information access section, a position of the optical storage medium at which the medium moving section loads the optical storage medium differs from a position of the optical storage medium at which the medium moving section releases the optical storage medium.

3. An optical information storage system comprising:
   multiple optical information storage apparatuses each having a medium storing section in which a plurality of optical storage media to which an information access is optically made are stored, an information access section in which the optical storage medium is loaded to make an information access to the optical storage medium, and a medium moving section that executes a supply process of moving the optical storage medium along a supply path from the medium storing section to the information access section and a recovery process of moving the optical storage medium along a recovery path from the information access section to the medium storing section, the optical storage medium on the supply path and another optical storage medium on the recovery path being able to pass each other;

a system housing in which the plurality of optical information storage apparatuses are detachably mounted; and a control section that controls information accesses to the multiple optical information storage apparatuses mounted in the system housing.

* * * * *